United States Patent [19]
Friedel

[11] Patent Number: 5,324,201
[45] Date of Patent: Jun. 28, 1994

[54] DOLL AND METHOD OF OPERATION

[76] Inventor: Joan Friedel, 219 Northway, Baltimore, Md. 21218

[21] Appl. No.: 37,750

[22] Filed: Mar. 26, 1993

Related U.S. Application Data

[63] Continuation-in-part of Ser. No. 827,316, Jan. 29, 1992, Pat. No. 5,197,885, which is a continuation of Ser. No. 669,625, Mar. 14, 1991, Pat. No. 5,094,621.

[51] Int. Cl.$^5$ .................. G09B 19/00; A63H 3/00
[52] U.S. Cl. ......................... 434/236; 446/268; 446/485
[58] Field of Search ............. 446/268, 72–74, 446/304, 303, 297, 219, 485; 434/236, 262

[56] References Cited

U.S. PATENT DOCUMENTS

| | | | |
|---|---|---|---|
| 2,631,408 | 3/1953 | Henry | 446/304 |
| 3,791,068 | 2/1974 | Pietrowiak | 446/485 X |
| 4,573,927 | 3/1986 | Newman | 434/236 |
| 4,645,470 | 2/1987 | Benton | 446/73 |
| 4,710,145 | 12/1987 | Hall Vandis | 434/236 X |
| 4,737,131 | 4/1988 | Sirota | 446/485 X |
| 4,762,494 | 8/1988 | Woods | 434/236 |
| 4,917,607 | 4/1990 | Van Hoose | 434/236 |
| 5,044,959 | 9/1991 | Shaver et al. | 434/236 |

FOREIGN PATENT DOCUMENTS

| | | | |
|---|---|---|---|
| 84059 | 12/1895 | Fed. Rep. of Germany | 446/73 |
| 634309 | 2/1928 | France | 446/73 |

Primary Examiner—Mickey Yu
Attorney, Agent, or Firm—Diller, Ramik & Wight

[57] ABSTRACT

A doll includes a body having a torso defining a cavity housing a shelf and closed by a door. A user tears a sheet from a note pad, writes a "secret" upon the sheet, inserts the sheet into a pocket into the star-like body and inserts the latter upon the shelf. The door of the cavity is closed and the star-like body and the "secret" upon the note is displaced for subsequent reuse. The "secret" can also be written upon the sheet torn from the note pad using a pen with conventional "disappearing" ink. Preferably a door or doors of the doll is then locked by a suitable time-delay mechanism to prevent access to the note until the ink/secret has disappeared, thus telling the user/child that the "secret" has been received by the "inner child" or doll and is respected (secret) thereby through its disappearance. Further, in lieu of blank sheets, a stack of preprinted sheets or cards may be provided each with a different "secret" or message thereon which the user can select, fold, insert into the star-like body, etc.

26 Claims, 7 Drawing Sheets

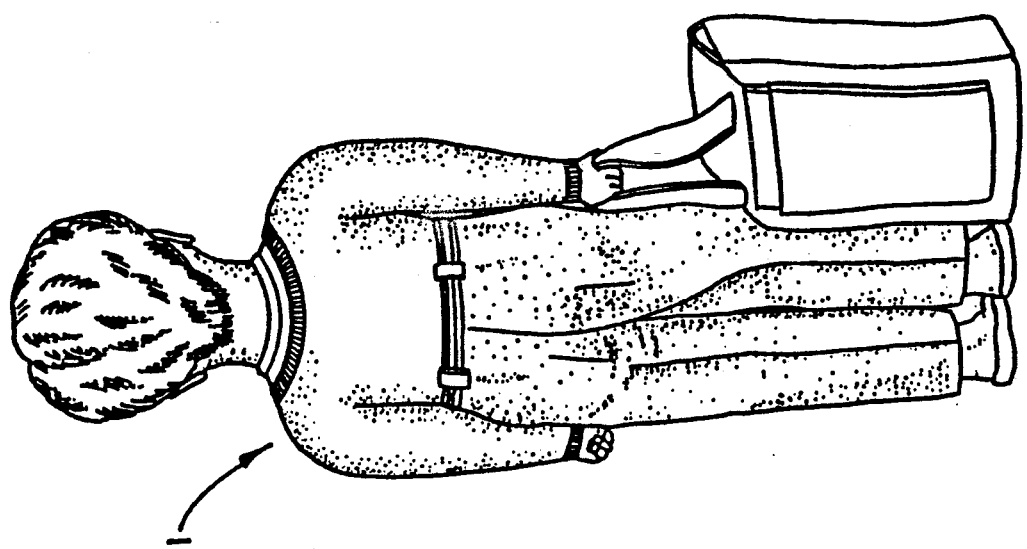
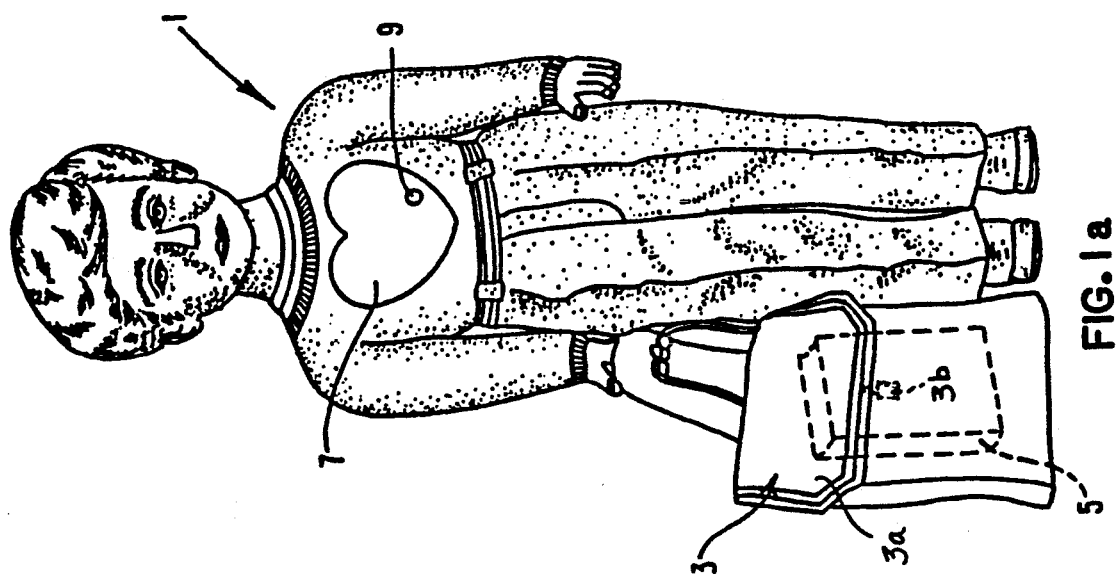

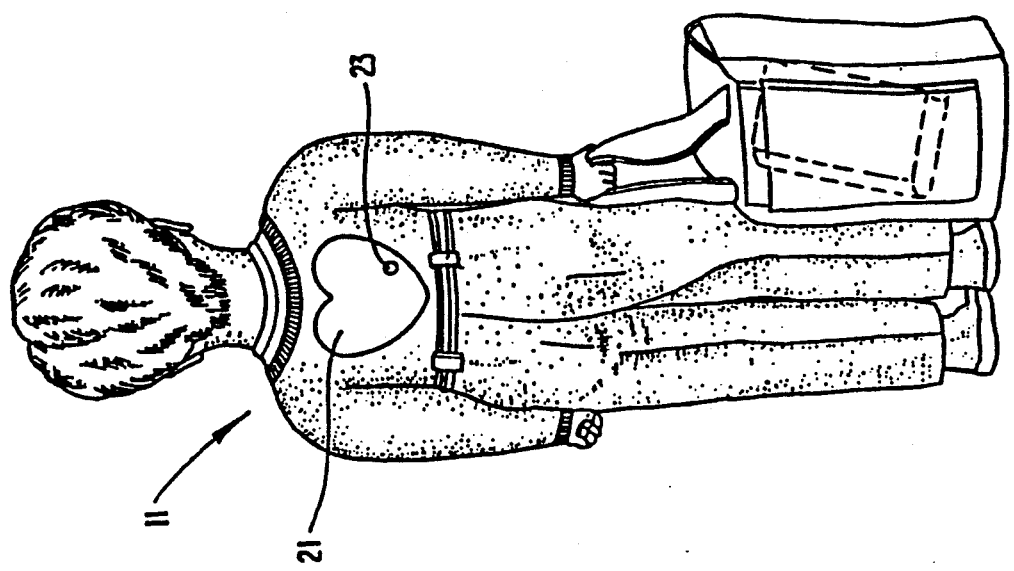
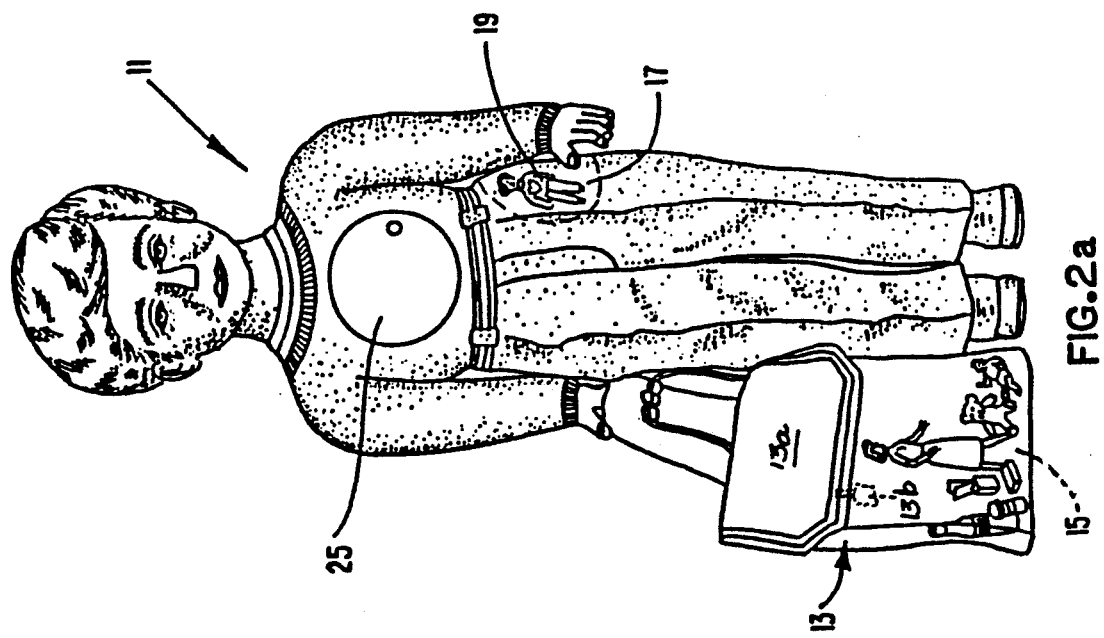

1

DOLL AND METHOD OF OPERATION

CROSS-REFERENCE TO RELATED APPLICATIONS

This application is a continuation-in-part application of pending application Ser. No. 07/827,316 filed Jan. 29, 1992 which is to issue on Mar. 30, 1993 under U.S. Pat. No. 5,197,885, and the latter patent being a continuation application of Ser. No. 07/669,625 filed Mar. 14, 1991 which granted on Mar. 10, 1992 under U.S. Pat. No. 5,094,621.

BACKGROUND OF THE INVENTION

The present invention relates to a therapeutic doll for use by a patient or the like, and more particularly, to a therapeutic doll including a cavity for storing icons and which includes features for dissuading a person from practicing his or her vice.

Addictions, including chemical dependency, afflict many people in our society. One of the most common procedures for curing someone with an addition is through self-help groups. It has been shown that talking about one's problems with others helps a person to cope with the physical suffering that accompanies an addiction such as chemical dependency. Such self-help groups have also been employed as therapy for other psychological maladies. Unfortunately, a person will spend more time outside of group therapy, away from the support of his or her peers. Therefore, there is a need for a method and device that allows a person to receive therapy away from the self-help group.

In U.S. Pat. No. 4,762,494, a psychotherapy doll is described. The doll includes several hook and pile attachment areas for attaching items that include eyebrows, tears, a smile and others. The patient that uses this doll is better able to show personal feelings by expressing those feelings through the doll.

In U.S. Pat. No. 4,917,607, a therapeutic doll is described. This rag-type doll includes a plurality of fabric forms that denote human feelings (e.g., hearts, light bulbs, star, etc.) These forms are inserted into appropriate areas by the patient to show where these feelings are experienced. By using this doll, the user is better able to communicate with a therapist.

In U.S. Pat. No. 4,710,145, another therapeutic doll is described. This doll includes a tape recording device that records and plays back vocal messages. The use of this doll assists in communications between the therapist and his or her patient.

U.S. Pat. No. 4,645,470 describes a doll having a concealed pocket. The user of the doll is able to communicate thoughts and feelings by placing items, such as written notes, into the hidden pocket.

The aforementioned dolls deal with communications between the patient and the therapist. These dolls, however, do not deal with personal therapy where a patient is able to treat his or her mental ailment without the assistance of a therapist or a self-help group (or in addition to this type of help or between therapist visits). Thus, there is a need for a therapeutic device which allows a patient to obtain benefit from therapy without outside personal assistance.

SUMMARY OF THE INVENTION

This and other needs are satisfied by the therapeutic doll of the present invention. In a first embodiment, the doll includes a translucent area, such as a heart, in its outer surface. The translucent area is illuminated upon pressing a push-button mechanism. The doll also includes a knapsack that holds a book or the like. This book contains legible material such as affirmations, prayers, sayings, thoughts, needs, witticisms, suggestions, and the like. A speech-producing device can also be provided which is coupled to the push-button mechanism.

The doll includes a cavity incorporated in its torso. The cavity includes a shelf upon which is permanently seated an "inner child" and upon which can be placed a variety of icons. These icons represent personal temptations. Upon pulling a pull-button, the shelf collapses and icons originally placed on the shelf fall through a hollow portion of a leg of the doll into an attached knapsack, but the "inner child" remains upon the shelf. A small replica of the therapeutic doll is provided to be carried by the user when separated from the doll. This replica reminds the user of the larger doll. The replica may also be a doll in the form of a small child to remind the user of the "inner child," discussed above.

The doll can also include a translucent area (areas) for illumination as well as a speech device. The back wall of the cavity can be decorated and may include tiny starlike perforations that are illuminated from behind the wall.

In keeping with another embodiment of the present invention, an object, such as a piece of paper with a "written" message or a "preprinted" message, or a slate upon which a user/child can write a "secret" or similar thoughts or indicia is placed upon the shelf. However, as aforesaid, when the shelf is moved to cause the object to fall, the "inner child" remains permanently attached to the shelf. Alternatively and preferably, the doll comprises part of a kit which includes a note pad, preferably decorated with stars or celestial-like bodies, a pencil or writing instrument, and a star-like body such as a large gold star or charm preferably constructed from fabric material which has a pocket into which a note with a "secret" written thereon by a child can be inserted. A child draws or writes secret thoughts, feelings, wishes, desires, comments, etc. on a sheet or page of the notebook, tears the page out, folds the paper and tucks the "secret" inside the star. Alternatively, in lieu of blank sheets upon which the child can write a "secret" message, the notebook can be provided with a variety of "preprinted" messages which can be removed/torn therefrom, folded, inserted into the star pocket, and placed upon the shelf. Obviously, a child, adolescent and/or adult can either write messages upon "plain" notebook paper and/or utilize the "preprinted" secrets/messages. The door in the doll's torso is opened and the star/charm is placed on the shelf alone or next to other objects/icons adjacent the "inner child." The child then closes the door, pulls the knob/pushes a button, and the star/charm with the secret message/feelings magically disappears, along with other of the icons/objects. The child can push a button or close the cavity door to simultaneously cause (a) the doll's heart to glow, (b) the stars to shine (miniature bulb/bulbs light), and (c) the speech-producing device of the doll operates to reassure the child that the message has been read, understood and affirms—"Your 'inner child'loves you always."—, or other affirmations, etc.

The method of the present invention for operating such a doll includes placing one or more icons onto the shelf in the cavity. Because of the icons/objects in the cavity, the user may be dissuaded from conducting his or her vice. After closing a hatch or door to prevent access to the cavity, the user pulls or presses a pull or push button mechanism, respectively, causing the icons to return back to a knapsack located next to a leg of the doll. The illuminated translucent area, vocal communication, and overall decoration of the doll encourage the user to cope with his or her problem.

In further accordance with the present invention, a note pad and a writing instrument (pencil or pen) or preprinted messages can be provided in association with a star charm, as earlier described, to permit a child to write upon the sheet of the note pad or select a message and insert the sheet or message in a pocket of the star/charm, open the torso of the doll, insert the star/charm upon the shelf, close the door to the torso and eventually cause the star/charm and the message carried thereby to disappear through a passage eventually exiting the doll's torso in the area of its hip into a bag, pouch or like compartment from which it can be accessed and reused.

A door which closes the cavity can be provided with a time-delay lock, and a similar lock is provided upon the lid or flap associated with a knapsack into which the star charm or star-like body is conducted when the shelf is operated to drop the star charm and its written or preprinted "secret" note. Preferably the "secret" written message is written by the child utilizing so-called "disappearing" ink which basically begins disappearing approximately two minutes after contacting paper. If the child writes a very short note utilizing a pen containing "disappearing" ink, this note can be placed in the star, deposited upon the shelf and the door closed well within the two minutes required for the "message" to disappear. However, once the cavity door is closed and the star with its note drops into the knapsack, purse or satchel, it is obviously desirable to make certain that the message has "disappeared" so that the child perceives that the "inner child" read the message, understood the message, and removed the message through its disappearance so that the message would forever be a "secret" between the child/user and the "inner child." To assure that the latter can occur, it is obviously necessary for the message to "disappear," and for this reason a conventional three-minute delay mechanism begins tolling when the cavity door is closed to keep the cavity door and a knapsack or purse lid or flap locked for three minutes and unlocking thereafter.

Other features, advantages and embodiments of the invention will be apparent to those skilled in the art from the following description, accompanying drawings and appended claims.

BRIEF DESCRIPTION OF THE DRAWINGS

FIGS. 1a–b are front and rear views of a doll constructed according to a first embodiment of the present invention.

FIG. 2a–d are front and rear views of a doll constructed according to a second embodiment of the present invention.

DETAILED DESCRIPTION

Figure 2D:
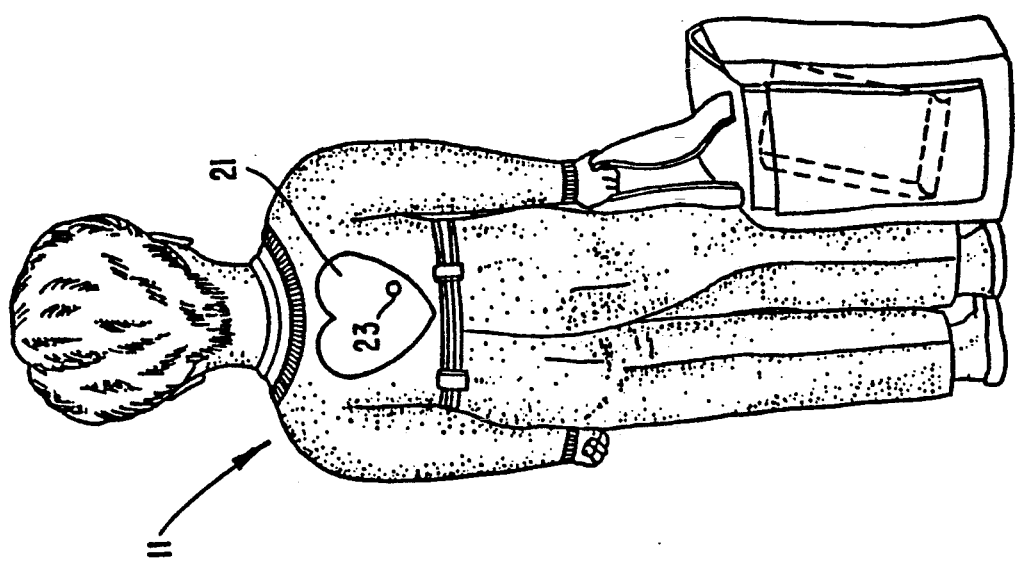

Referring to FIG. 1, the doll of the present invention is shown. The doll 1 has human features such as skin, color and sex. It is of an advantage if the doll 1 resembles the user so that the user will identify with the doll 1. The doll 1 includes a knapsack 3 which holds items such as a book 5 closed by a foldable flap or cover 3a which can be locked by a battery operated, time delayed, armature/pin and coil locking mechanism 3b of a conventional construction. The book 5 can contain instructional material for the user, such as a book of affirmations. The doll 1 also includes a heart area 7 and a push-button button mechanism 9. When the push-button mechanism 9 is depressed, a speech-producing device, such as a conventional voice synthesizing chip (not shown), outputs a vocal message. The programming of a voice synthesizing is well known to one of ordinary skill in the art. The vocal communication can be any of a variety of prayers, affirmations, suggestions, etc. For instance, depression of the push-button mechanism 9 could cause the voice synthesizing chip to output the Serenity Prayer: "God grant me the serenity to accept the things I cannot change, courage to change the things I can, and the wisdom to know the difference." In a further example, the voice synthesizing chip could output vocal communications as if they are coming from the "inner child" of the user or the doll. Therefore, the user is able to orally communicate with his or her "inner child." The heart area 7 can also be translucent, such that a light (not shown) within the doll 1 illuminates the heart area 7 when the push-button mechanism 9 is depressed.

Referring to FIG. 2, a doll 11 constructed according to an embodiment of the present invention similar to FIG. 1 is shown. The doll 11 also includes a knapsack 13 which carries a plurality of icons shown generally as 15 which can be closed by a foldable cover or flap 13a, and locked by a conventional armature/pin and coil locking mechanism 13b. As seen in FIG. 2a, the doll 11 includes a front pocket 17 which can hold any of a variety of items including a miniature doll 19 which is a smaller version of the doll 11 of the present invention. This miniature doll 19 can be carried by the user separately from the therapeutic doll 11 and serves as a good luck charm, reminding the owner of the doll 11.

As seen in FIG. 2b, the doll 11 includes a back heart area 21 and a back pull-button mechanism 23. Operation of the heart area 21 and pull-button mechanism 23 is similar to the corresponding items of FIG. 1. As seen in FIG. 2a, the doll 11 includes a front door or hatch 25 which closes an inner cavity 27.

Figure 2C:
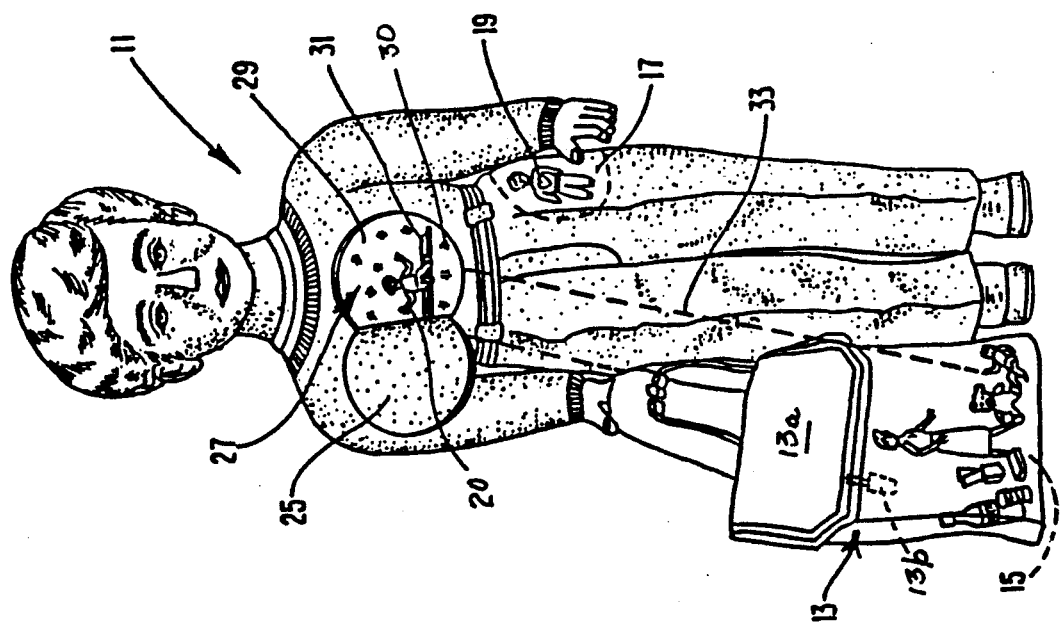

Referring to FIG. 2c, the cavity 27 of the doll 11 and its operation are shown. The front hatch 25 opens to reveal the cavity 27. The cavity 27 includes a back wall 29 which can be decorated. As seen in FIG. 2c, the back wall 29 is decorated with stars 30. The inner cavity 27 also includes a small shelf 31 upon which is permanently seated an "inner child" 20. Any of the icons 15 can be placed on the shelf 31. The user places one or more of the icons 15 onto the shelf 31 and closes the front hatch 25. The user can then pull the pull-button mechanism 23. Pulling of the pull-button 23 releases the shelf 31, causing the icons to fall but the "inner child" 20 remains upon the shelf 31. The cavity 27 is coupled to a hollow portion 33 in the leg area of the doll 11. This hollow portion 33 opens into the knapsack 13. Thus, the icons return to the knapsack after pull-button 23 is pulled. As in the doll of FIG. 1, a speech-producing device or voice synthesizing chip, is preferably located in a cavity of the doll's head (not shown) or in a false bottom of the knapsack 13 which can output a vocal message upon pushing the push-button mechanism 23. Also, the heart area 21 can be illuminated. By replacing the shelf 31 to its original position, the voice synthesizing chip automatically turns off or can be manually turned off by an appropriate push button or switch (not shown). In addition, the illumination of the heart area 21 could also be used to light up small pinholes (unnumbered) within the stars 30 in the back wall 29 of the cavity 27. The pinholes can be arranged to display a message, such as "LOVE."

Figure 3:
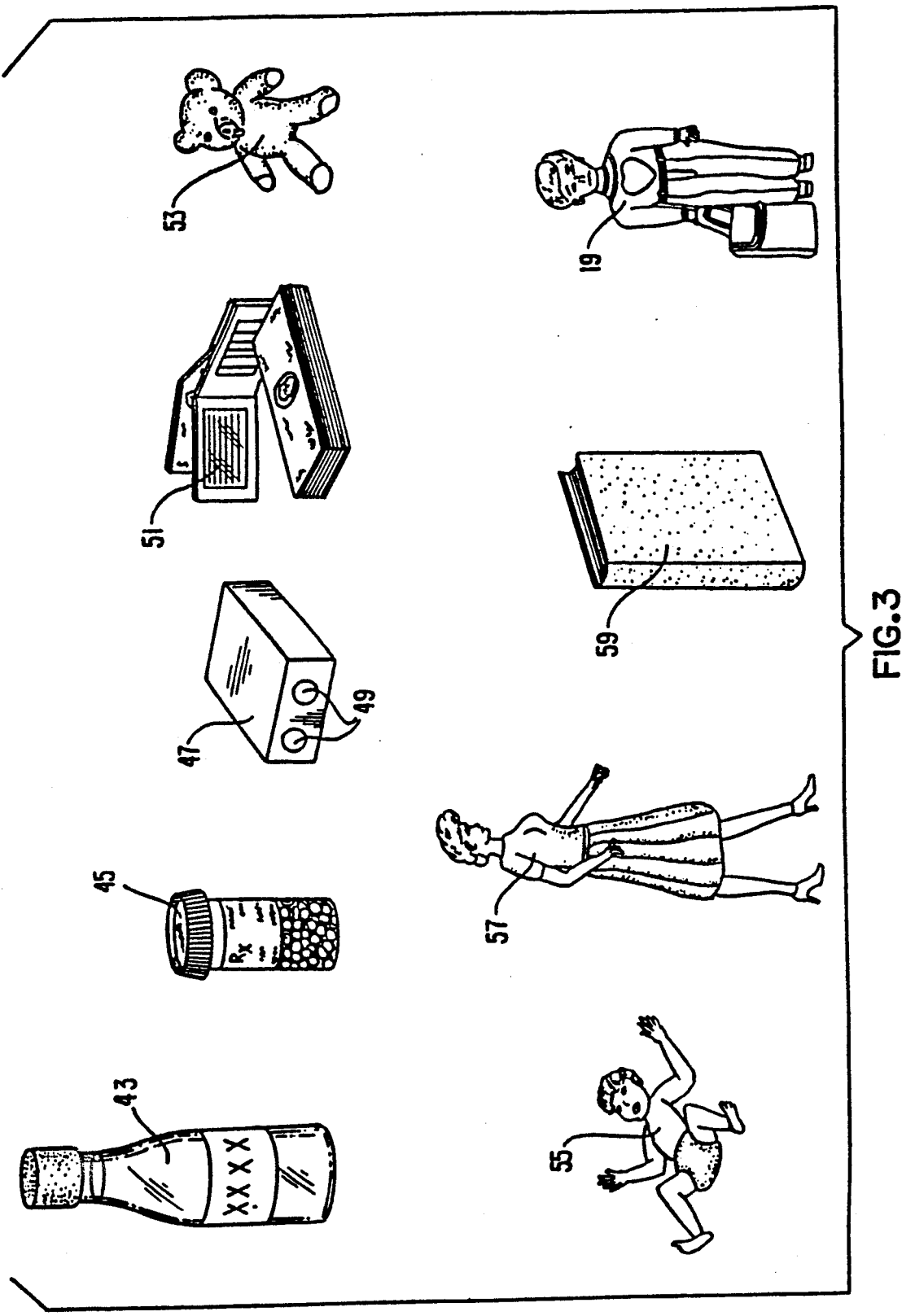
FIG. 3 is a schematic diagram of icons and accessories for the doll of FIG. 2.

Referring to FIG. 3, sample icons and accessories of the doll of the present invention are shown. The icons 41 represent personal temptations and include a variety of figures such as: a plastic liquor bottle 43, a plastic pill jar 45, a cardboard candy box 47 with plastic candies 49, a paper bank envelope 51 (which includes play money), a teddy bear 53, a baby doll 55, a parent doll 57, a book of instructions and/or affirmations 59, and the replica doll 19. The baby doll 55 can also substitute as an "inner child" to be carried by the user. The book of affirmations 59 is described above with reference to the book 5 of FIG. 1. Personal charms or toys of the user can be employed in lieu of any one and/or all of the aforementioned icons/accessories.

In operation, the user is encouraged to identify with the doll. In other words, the doll is to represent the user. By playing a message, such as the Serenity Prayer, the doll encourages the user to restrain himself from using drugs or the like. The tiny stars 30, which are "lighted" in a manner to be described more fully hereinafter with respect to the doll of FIG. 4, appearing on the back wall of the cavity esoterically show man's relationship to the universe or God. The user is encouraged to get in touch with that which has been referred to in psychiatric literature as the "inner child" 20 enable the user to do "inner child" work with items such as the teddy bear, the parental doll, messages/"secrets," for example. More importantly, the user may think twice about giving things, such as liquor, drugs, candy, or money to the "inner child" 20 seated upon the shelf 31 in the cavity 27 of the doll. Therefore, the therapeutic doll of the present invention encourages the user to give up his or her vice(s).

The "inner child" 20 seated on the shelf 31 in the cavity 27 represents the childhood past of the participating adult. The adult can orally talk to his "inner child" 20 and allow the "inner child" 20 to make his or her needs known. The adult can finally take care of his neglected, inadequate, lonely, abuse, unloved, unwanted or shamed self that still operates as a child by getting in touch with his past memories, feelings and experiences. By nurturing this wounded "inner child," an inner strength develops allowing a healing of the body, mind and spirit in the now grown adult. Further information on the "inner child" theory can be found in *Homecoming: Reclaiming and Championing Your Inner Child* by John Bradshaw and *Healing Your Aloneness: Finding Love and Wholeness Through Your Inner Child* by Erika J. Chopich and Margaret Paul.

Figure 4:
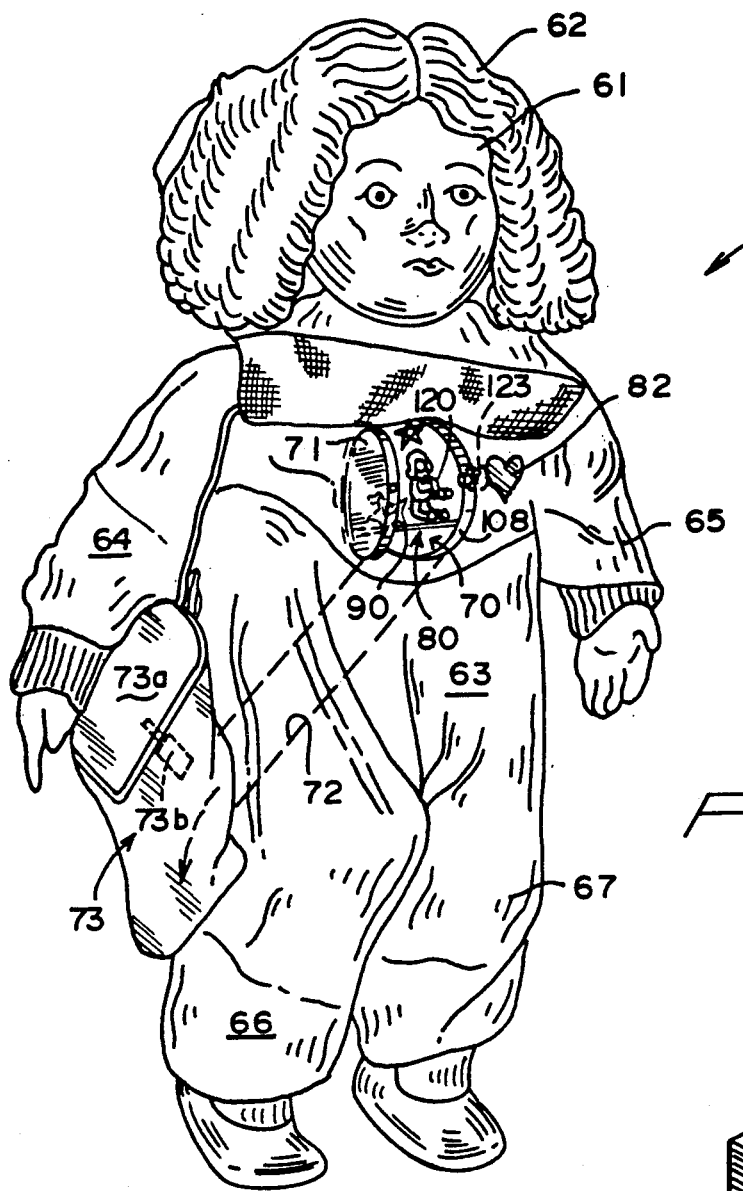
FIG. 4 is a perspective view of another doll constructed in accordance with another embodiment of the invention, and illustrates a star-like body or charm having a pocket housing a message resting upon a shelf within a cavity of the doll beside the "inner child" permanently seated on the shelf.
Figure 5:
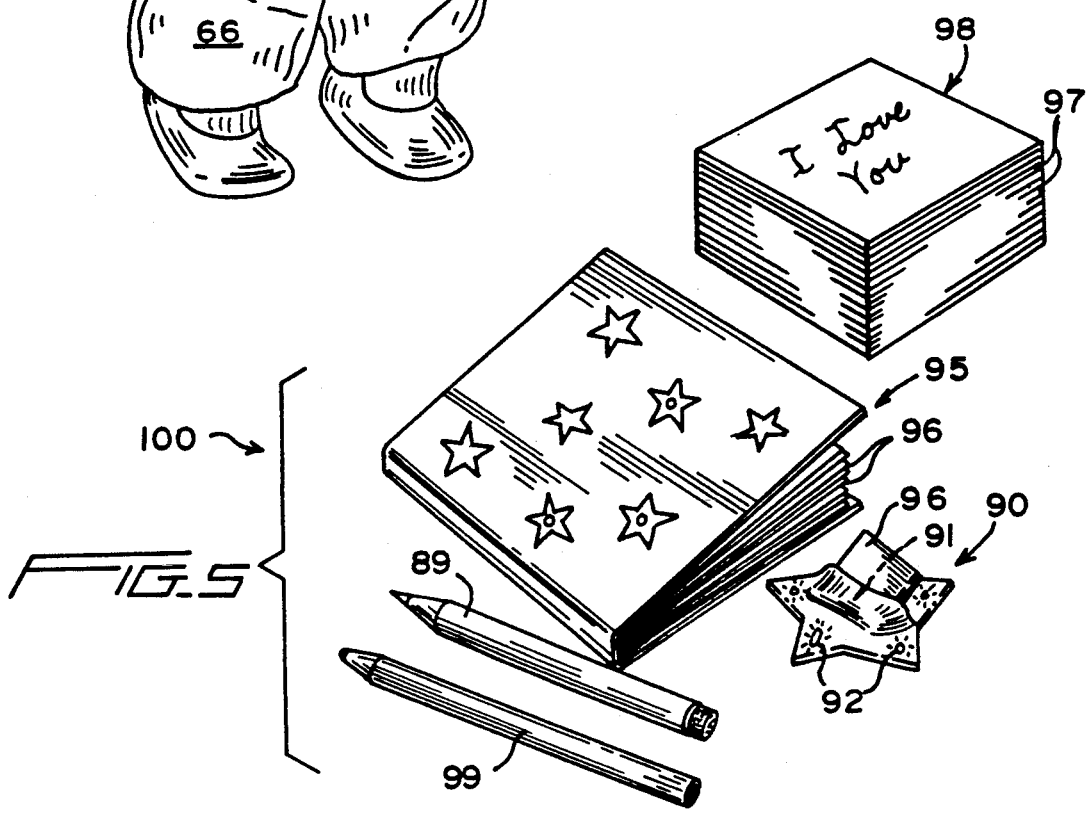
FIG. 5 is an exploded view of the star-like body or charm, a notebook, a stack of preprinted message cards and writing instruments (pencil or pen), and a folded note/card upon which a "secret" has been written by a child or preprinted and inserted into a pocket of the star-like body or charm.

Reference is made to FIG. 4 of the drawings which illustrates another doll of the present invention which is generally designated by the reference numeral 60. The doll 60 has human features, such as skin color and sex, and is preferably constructed to resemble the user, so that the user will identify with the doll 60, just as in the case of the dolls 1 and 11.

Figure 7:
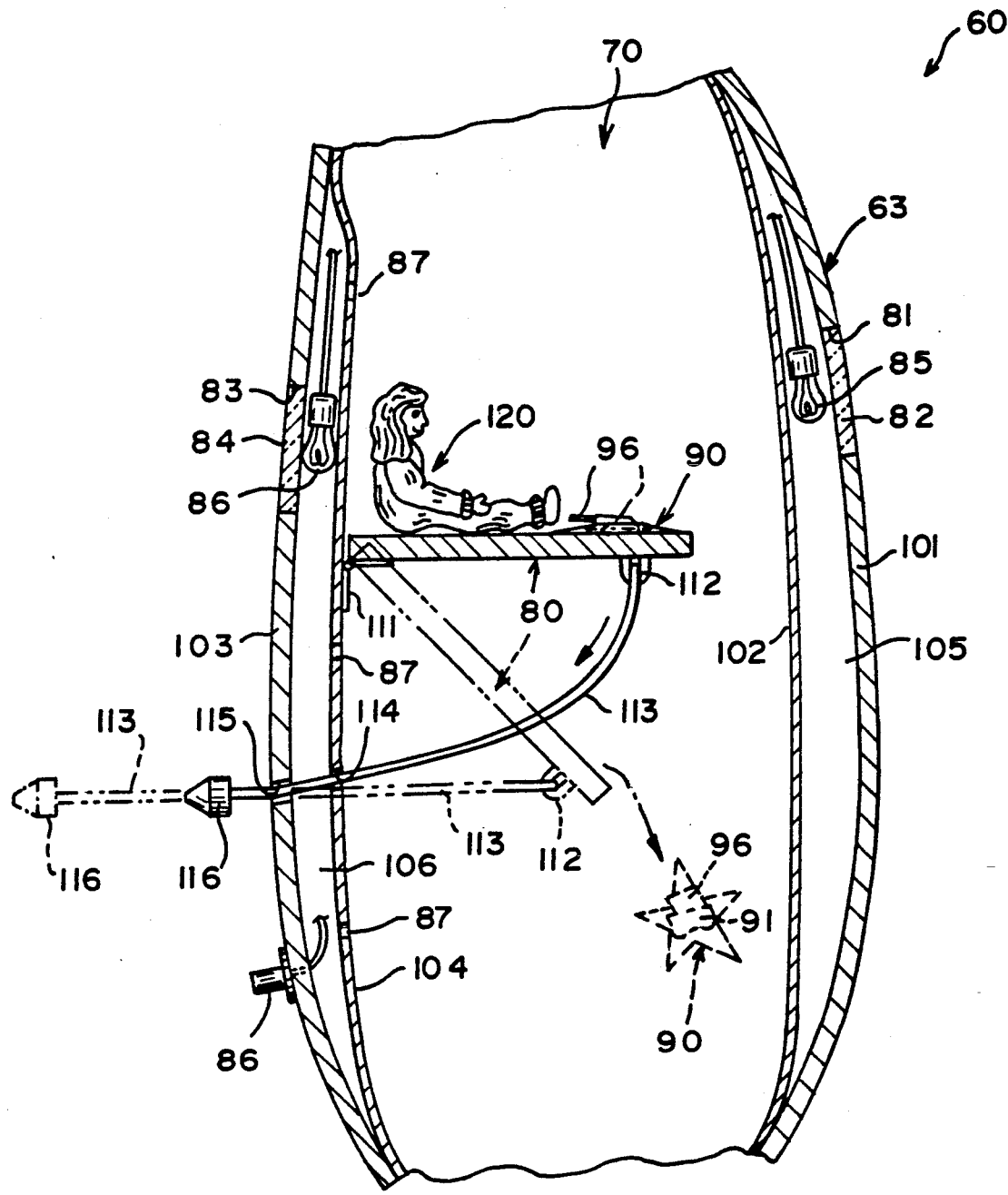
FIG. 7 is an enlarged fragmentary longitudinal top-to-bottom view of the doll of FIGS. 4 and 6, and illustrates details of the shelf, the hearts in rear and front walls, and miniature bulbs sandwiched between outer and inner rear walls and outer and inner front walls with the inner rear wall having a plurality of perforations through which the light shines in the manner of "stars" when viewed through the door cavity opening of the doll.

In the present embodiment of the invention, the doll 60 is illustrated as a female doll 60 having a head 61, a wig or hair 62, a torso 63, arms 64, 65 and legs 66, 67. The head 61 includes a cavity (not shown) beneath the wig 62 which houses batteries (also not shown) for illuminating lights, operating a time delay, locking a lock(s), etc., as will be described more fully hereinafter. The doll 60 is preferably constructed as a "soft" and "poseable" doll and includes as part thereof an inner cavity 70 (FIGS. 4 and 7) which houses a shelf 80 upon which objects, such as a star 90 or the earlier described icons 15, can rest. Means 71 in the form of a door is provided for opening and closing access to the shelf 80 within the cavity 70 relative to an opening 108. A passage 72 leads from an area beneath the shelf 80 exiting the torso 63 of the doll 60 generally in a hip area (unnumbered) of the leg 66 of the doll's torso 63. The passage 72 accesses the interior of a chamber or cavity defined within a knapsack, purse, satchel or the like 73 which has a lid or flap 73a capable of being opened and closed and locked by Velcro, snaps, buttons, or might instead be closed by a conventional pin/armature and coil latching mechanisms 73b, as will be described more fully hereinafter.

Figure 6:
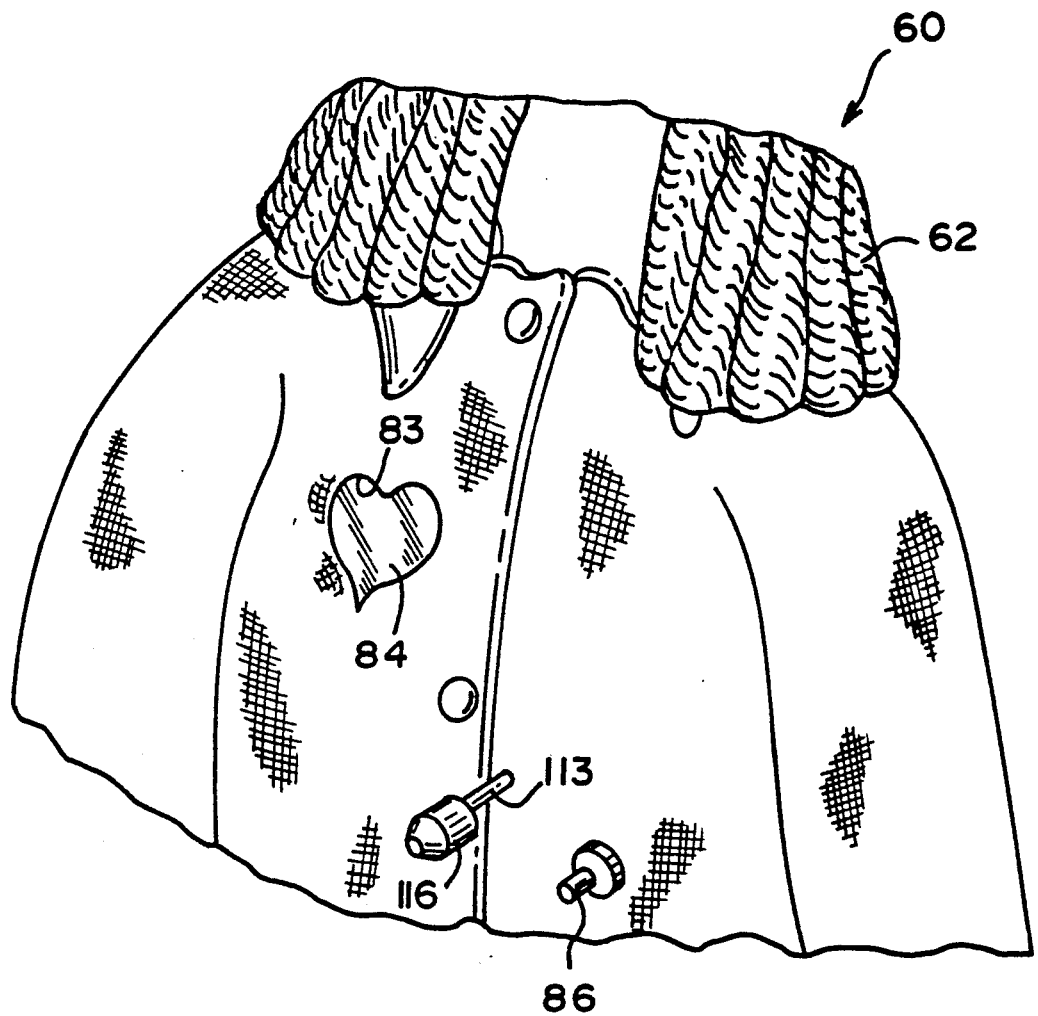
FIG. 6 is a fragmentary rear perspective view of the doll of FIG. 4, and illustrates a push-button for internal illumination, a pull-button for moving the shelf within the cavity, and a heart of red translucent material corresponding to a like heart formed in the front wall of the doll.

The torso 63 of the doll 60 (FIG. 7) includes a front outer wall 101, a front inner wall 102, a rear outer wall 103 and a rear inner wall 104. The walls 101, 102 and 103, 104 define respective chambers 105, 106. Heart-shaped openings 81, 83 are formed in the outer walls 101, 103, respectively, and inserted within the heart-shaped openings 81, 83 are respective red translucent "hearts" or heart-shaped pieces of plastic 82, 84, respectively. A miniature bulb 85, 86 is located in the respective chambers or cavities 105, 106, and appropriate wires (unnumbered) connect these bulbs 85, 86 to a push-button switch 86 (FIGS. 6 and 7) which in turn includes wires (unnumbered) connected to the batteries (not shown) in the cavity (not shown) of the doll's head 61 beneath the wig 62. When the push-button 86 is depressed, the lights 85, 86 will light and the voice synthesizer, which is also connected to the batteries in the head 61, will be actuated. Obviously, the light emitted from the bulbs 85, 86 will cause the hearts 82, 84 to "glow" and light will also be dispersed into the cavity 70 through perforations 87 formed in the rear inner wall 104. The perforations 87 are preferably located centrally of tiny stars (not shown) painted or otherwise applied to the innermost surface (unnumbered) of the rear end wall 104 facing the cavity 70.

The shelf or shelf means 80 is connected by a conventional hinge 111 to the rear inner wall 104 (FIG. 7) and is connected at a conventional pivot connection 112 to a pull rod 113 which projects through openings 114, 115 of the rear inner wall 104 and the rear outer wall 103, respectively. The rod 113 includes a handle or knob 116 above and adjacent the push-button 86 (See FIGS. 6 and 7).

An "inner child" 120 is permanently seated upon the shelf 80. Thus, when the handle 116 is grasped to pull the rod 113 to pivot the shelf 80 to the phantom outline position shown in FIG. 7, objects such as the star 90 will fall from the shelf 80, but the "inner child" 120 will remain thereon.

The front walls 101, 102 include concentric circular openings of which only the circular opening 108 of the outer front wall 101 is shown in FIG. 4. However, the wall 102 includes a circular opening aligned with the opening 108. Furthermore, the wall 101 includes a locking mechanism of a conventional construction generally designated by the reference numeral 123 in FIG. 4. The locking mechanism 123 includes a coil in which is slidably mounted a spring-biased armature or pin. When the coil is energized through the operation of the push-button 86 or another push-button, through the batteries located in the cavity of the dolls-head 61, the pin of the locking mechanism 123 will enter the illustrated and unnumbered aperture in the edge of the door 71 shown in FIG. 4. Preferably a time delay mechanism (not shown) is associated with the locking mechanism 123 which will hold the door 71 locked for approximately three minutes, for purposes to be described more fully hereinafter.

The doll 60 of FIG. 4 is part of a kit which is generally designated by the reference numeral 100 which includes the star, star-like body, object or charm 90, a notebook 95 and/or a stack 98 of preprinted message cards 97 and writing instruments 89, 99, such as a conventional pen, pencil crayons, and/or colored markers 89 and a pen 99 preferably containing "disappearing" ink. The object or star-like body or charm 90 is preferably made from fabric or cloth material and is relatively large so that it can not be ingested by a small child and is sewn to define a pocket 91. The star-like body 90 might include one or more lights 92 which will be rendered operative to cast a steady light or "twinkle" intermittently when a "secret" written upon a sheet 96 torn from the notebook 95 or selected from the preprinted sheets of the stack 98 is inserted within the pocket 91 by a child. Conventional miniaturized circuitry is well known and can be readily incorporated in the star-like body 90, just as is commonly done in "gag" ties, birthday cards, etc. Basically, a child opens the notebook 95, writes his or her "secret(s)" thereupon, tears the sheet or notepaper 96 from the notebook 95, folds the same and inserts the same into the pocket 91 of the star-like body 90. Alternatively, one of the preprinted cards 97 can be selected from the stack 98, folded and inserted into the pocket 91 of the star-like body 90. The uppermost card 97 of the stack 98 is printed with the message "I love you" but, obviously, each card 99 of the stack 98 has a different message printed thereon. The conventional electronic circuit (not shown) of the star-like body 90 is "off" when the pocket 91 is empty or closed, but the circuit is turned "on" when the note 96 or card 97 is inserted therein. The child then opens the door 71, inserts the star, charm or object 90 upon the shelf 80, including the "secret(s) "written upon the note 96 or preprinted on the card 97, closes the door 71 and actuates the doll 60 by pulling the handle/knob 116 to displace the object 90 and the associated note 96 or card 97 from the shelf 80, as shown in phantom outline in FIG. 7. The star-like object/charm 90 and the note 96 or card 97 passes down the passage 72 and is eventually deposited into the bag or knapsack 73 for eventual withdrawal and reuse. However, by pushing the push-button 86 or by closing the door 71 or automatically by a switch closed by the descent of the star-like body 90 along the passage 72, the hearts 82, 84 of the doll 60 and/or the perforations/stars 87 at the back inner wall 104 of the cavity 70 can be appropriately illuminated. The latter indicates to the child that the "secret(s)" upon the note 96 or card 97 have been accepted and respected by the "inner child" 120 and/or the doll 60. The knob 116 is pushed to return the shelf 80 to its original position (solid lines in FIGS. 4 and 7) before the door 71 is reopened.

In order to further authenticate the fact that the "secret(s)" written upon the note 96 is both accepted and "respected" (kept secret) by the "inner child" 120 and/or the doll 60, the pen 99 containing conventional "disappearing" ink can be used to write the message upon the note or sheet 96 torn from the book 95. Such conventional "disappearing" ink begins to disappear approximately two minutes after contact with paper, a time estimated to be sufficient for a child to write a short note. However, if a child utilizes approximately the totality of two minutes to write the note, the first portion of the note will begin disappearing, whereas the last portion of the note will require approximately two minutes to totally disappear. Accordingly, it is desired that whatever might be the "secret" it should fully disappeared before the knapsack 73 can be accessed and/or the door 71 reopened after having been once closed. Accordingly, the conventional locking mechanisms 123, and 73b, the latter being utilized to lock the flap or lid 73a of the knapsack 73, are designed to simultaneously lock and unlock under a three minutes time-delay mechanism of a conventional construction. Thus, when the door 71 closes, the conventional time-delay mechanism begins to time-out and neither the door 71 nor the flap 73a of the knapsack 73 can be opened until after three minutes, thus assuring that any "secret" written in disappearing ink upon the note or sheet 96 has disappeared. Thereafter the knapsack 73 can be opened, the child can withdraw the note 96 from the star-like body 90, and the written "secret" will have disappeared, thus emphasizing to the child that this "secret" has been accepted, witnessed and respected by the "inner child" 120 and/or the doll 60.

While the knob 116 and the rod 113 associated therewith and the push-button 86 are accessible at the back outside wall 103 of the torso 63, obviously these can also be accessible via the front wall 101 in keeping with the present invention. Additionally, while the stars/perforations 87, the hearts 82, 84 and the voice synthesizer are preferably operated simultaneously either by the push-button 86 or automatically by the closure of the door 71, any combination of operations of these three elements, as well as the locking of the door 71 and the flap 73a of the knapsack 73 by any one of the conventional locking mechanisms 3b, 13b, 73b and/or 123 is considered to be within the scope of the present invention. The message(s) 96 and/or 97 can be placed directly upon the shelf 80 absent utilization of the star 90. The various time delay mechanisms can also be eliminated which would allow a message/note written in "disappearing" ink to be inserted within the cavity 70 of the doll 60 without locking the doors 71 and/or 73a. Furthermore, though a single message has been illustrated upon the uppermost card 97 of the stack 98 of individual preprinted cards or notes, a number of other messages can be printed thereon, as, for example, "Today I will be brave," "Today I will be kind," "Today I will be caring," etc. which are motivational concepts leading the user of the doll 60 and the "inner child" concept toward a life filled with light and love emanating from usage of the present invention.

Although a preferred embodiment of the invention has been specifically illustrated and described herein, it is to be understood that minor variations may be made in the apparatus without departing from the spirit and scope of the invention, as defined the appended claims.

I claim:

1. A doll comprising a body including a torso, means for defining a first cavity within said torso, a shelf upon which an object can be disposed within said first cavity, means for opening and closing access to said shelf via said first cavity, means for defining a second cavity, and means for displacing an object relative to said shelf and into said second cavity whereby said object is generally out of sight via said access means when the latter is open.

2. The doll as defined in claim 1 wherein said object displacing means is constructed and arranged for moving said shelf to displace the object thereupon.

3. The doll as defined in claim 1 including an object, and said object includes means for defining a chamber into which another object can be at least in part inserted.

4. The doll as defined in claim 1 including an object, said object includes means for defining a chamber into which another object can be at least in part inserted, another object and said another object is a piece of paper upon which a user can write "secret" or similar thoughts or indicia.

5. The doll as defined in claim 1 including an object, said object includes means for defining a chamber into which another object can be at least in part inserted, and said first-mentioned object is a star-like body.

6. The doll as defined in claim 1 including an object, said object includes means for defining a chamber into which another object can be at least in part inserted, said first-mentioned object is a star-like body, and said chamber is a pocket.

7. The doll as defined in claim 1 including an object, and another object said object includes means for defining a chamber into which another object can be at least in part inserted, said first-mentioned object is a star-like body and said another object is a piece of paper upon which a user can write "secret" or similar thoughts or indicia.

8. The doll as defined in claim 1 including an object, and another object said object includes means for defining a chamber into which another object can be at least in part inserted, said first-mentioned object is a star-like body, said another object is a piece of paper upon which a user can write "secret" or similar thoughts or indicia, and said chamber is a pocket into which the piece of paper can be inserted.

9. The doll as defined in claim 1 including means for conducting the object to said second cavity which is located beneath said shelf.

10. The doll as defined in claim 1 including means for conducting the object to said second cavity which is located beneath said shelf and exteriorly of said torso.

11. The doll as defined in claim 1 including means for conducting the object to a location beneath said shelf and exteriorly of said torso into said second cavity.

12. The doll as defined in claim 1 including means for conducting the object to a location beneath said shelf and exteriorly of said torso into said second cavity, and means for accessing said second cavity exteriorly of said torso.

13. The doll as defined in claim 1 including means for conducting the object to said second cavity which is located beneath said shelf and exteriorly of said torso.

14. The doll as defined in claim 1 including means for conducting the object to said second cavity which is located beneath said shelf and exteriorly of said torso via a passage.

15. The doll as defined in claim 1 including an object, said object is a medium upon which a child's secret thoughts or like indicia can be written.

16. The doll as defined in claim 1 including an object, said object is a star-like body, and means for effecting illumination of said star-like body.

17. The doll as defined in claim 3 including another object, said first-mentioned object is a star-like body having a chamber into which said another object can be at least in part inserted, means for effecting illumination of said star-like body, and said another object initiates the illumination of said star-like body upon the insertion thereof into said chamber.

18. A doll kit comprising a doll including a body having a torso, means for defining a first cavity within said torso, a shelf upon which an object can be placed disposed within said first cavity, means for opening and closing access to said shelf via said first cavity, means for defining a second cavity, means for displacing an object relative to said shelf and into said second cavity whereby said object is generally out of sight via said access means when the latter is open; and an object having or upon which a user can write "secret" or similar thoughts or indicia prior to placing said object upon said shelf.

19. The doll kit as defined in claim 18 including writing means for writing indicia upon said object.

20. The doll kit as defined in claim 18 wherein said object is notepaper.

21. The doll kit as defined in claim 18 including another object including a chamber into which said first-mentioned object can be inserted.

22. The doll kit as defined in claim 18 wherein said object is a writing "slate."

23. The doll kit as defined in claim 21 wherein said another object is a star-like body.

24. A doll comprising a body including a torso, means for defining a cavity within said torso, means in said cavity for supporting an object thereon which can be placed within said cavity, an object, means for opening and closing access to said cavity, print means carried by said object which disappears in a predetermined time interval, means for locking said opening and closing access means in its closed position to prevent access to said object after said object has been inserted into said cavity, and means for preventing the opening of said opening and closing access means until the lapse of said predetermined time interval.

25. The doll as defined in claim 24, wherein said supporting means is a shelf, said object is a piece of paper and said print means is indicia written in the disappearing ink.

26. The doll as defined in claim 25 including an "inner child" object permanently seated upon said shelf.

* * * * *